(12) United States Patent
Yang

(10) Patent No.: US 7,453,836 B2
(45) Date of Patent: Nov. 18, 2008

(54) ELECTRONIC DEVICE AND CONTROL METHOD THEREOF

(75) Inventor: Chee-hwan Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 534 days.

(21) Appl. No.: 11/133,337

(22) Filed: May 20, 2005

(65) Prior Publication Data

US 2005/0266890 A1 Dec. 1, 2005

(30) Foreign Application Priority Data

May 27, 2004 (KR) ...................... 10-2004-0037627

(51) Int. Cl.
*H04Q 7/20* (2006.01)
(52) U.S. Cl. ...................... 370/311; 370/318; 455/574; 455/127.5; 455/566
(58) Field of Classification Search ................ 370/310, 370/324, 310.2, 328, 338, 350, 311, 318, 370/401; 455/566, 550.1, 421, 422.1, 403, 455/567, 553.1, 552.1, 574, 127.5, 157.2, 455/161.2
See application file for complete search history.

(56) References Cited

U.S. PATENT DOCUMENTS 6,069,568 A * 5/2000 Tsuchiyama ............... 340/7.55

| | | | |
|---|---|---|---|
| 6,418,329 B1 * | 7/2002 | Furuya | 455/566 |
| 7,103,389 B2 * | 9/2006 | Shibata | 455/567 |
| 7,120,473 B1 * | 10/2006 | Hawkins et al. | 455/575.1 |
| 7,260,390 B1 * | 8/2007 | Skinner et al. | 455/420 |
| 2003/0118015 A1 | 6/2003 | Gunnarsson et al. | |

FOREIGN PATENT DOCUMENTS

| | | |
|---|---|---|
| CN | 1356641 | 9/2001 |
| JP | 2001-136117 | 5/2001 |
| JP | 2002-64596 | 2/2002 |
| KR | 10-298903 | 1/2001 |
| KR | 2003-75476 | 9/2003 |

OTHER PUBLICATIONS

Notice of Official Action issued by the Korean Intellectual Property Office in Patent Application No. 10-2004-37627 dated Jan. 27, 2006 (4 pages).

* cited by examiner

*Primary Examiner*—Jean A Gelin
(74) *Attorney, Agent, or Firm*—Staas & Halsey LLP

(57) ABSTRACT

A wireless communicating electronic device including a wireless network part supporting the wireless communication; an on/off selector selecting an on/off state to activate/deactivate the wireless network part; an on/off display displaying the selected state of the wireless network part; and a controller activating/deactivating the wireless network part corresponding to a selecting result of the on/off selector, and displaying the selected state of the wireless network part on the on/off display.

11 Claims, 5 Drawing Sheets

ELECTRONIC DEVICE AND CONTROL METHOD THEREOF

CROSS-REFERENCE TO RELATED APPLICATION

This application claims the benefit of Korean Patent Application No. 2004-37627, filed on May 27, 2004, in the Korean Intellectual Property Office, the disclosure of which is incorporated herein by reference.

BACKGROUND OF THE INVENTION

1. Field of the Invention

The present invention relates to an electronic device and a method of controlling the electronic device, and more particularly to an electronic device and a control method of providing an on/off state of wireless network system offering wireless communication to a user.

2. Description of the Related Art

Computer applications include developments in network technology, such as the Internet. In particular, portable computers such a laptop computer, a PDA, a tablet computer, etc., are being developed to include a wireless network system offering wireless Internet access using a wireless LAN. Thus, wireless access to the Internet provides users with more freedom and mobility.

To support such a wireless network system, various international standards define wireless LAN communication. The IEEE 802.11a/b/g is the most well known international standard. The wireless LAN according to the IEEE 802.11a/b/g adapts a high radio frequency between 2.4 GHz and 5 GHz.

However, this high radio frequency may interfere other electronic equipment causing malfunction or damage to other electronic equipments. Thus, installing or using a wireless network communication system through the wireless LAN is prohibited certain areas, such as an aviation industry, a hospital, a laboratory, etc., where operation of the electronic equipment has to be more accurate than any other places otherwise it might cause a critical problem.

For example, the FAA (Federal Aviation Administration) suggests that all of portable electronic equipments using the wireless LAN should have a function to turn on/off the wireless LAN.

Accordingly, manufacturers of the portable electronic equipment using the wireless LAN install an on/off button or a function key on the portable electronics equipments to turn on/off the wireless LAN.

However, if a user purposely or unknowingly turns off the wireless LAN function, the user might think that the wireless LAN of the electronic equipment is malfunctioning if the user is not aware of the wireless network communication.

Most complaints related to the wireless LAN involve the wireless LAN being turned off and the user trying to use the wireless LAN without turning it on.

SUMMARY OF THE INVENTION

The foregoing and/or other aspects of the invention are also achieved by providing a wireless communicating electronic device including a wireless network part supporting wireless communication; an on/off selector selecting an on/off state of the wireless network part to activate/deactivate the wireless network part; an on/off display displaying the selected state of the wireless network part; and a controller activating/deactivating the wireless network part corresponding to a selecting result of the on/off selector, and displaying the selected state of the wireless network part on the on/off display.

According to an aspect of the invention, when the wireless network part is selected to be in the off state by the on/off selector, the controller blocks a signal transmitted through the wireless network part.

According to an aspect of the invention, when the controller detects a signal satisfying a given condition when the wireless network part is in the off state, the controller displays that the wireless network part is currently in the off state on the on/off display.

According to an aspect of the invention, the given condition includes detecting a request for the wireless communication through the wireless network part.

According to an aspect of the invention, the on/off display includes an image display device visually displaying an image.

According to an aspect of the invention, the on/off display includes an LED (Light Emitting Diode) flashing depending on the on/off state of the wireless network part.

The foregoing and/or other aspects of the invention are also achieved by providing a method of controlling an electronic device including a wireless network part supporting wireless communication, including turning off the wireless network part; inputting a request for the wireless communication through the wireless network part when the wireless network part is turned off; and displaying an off state of the wireless network part.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
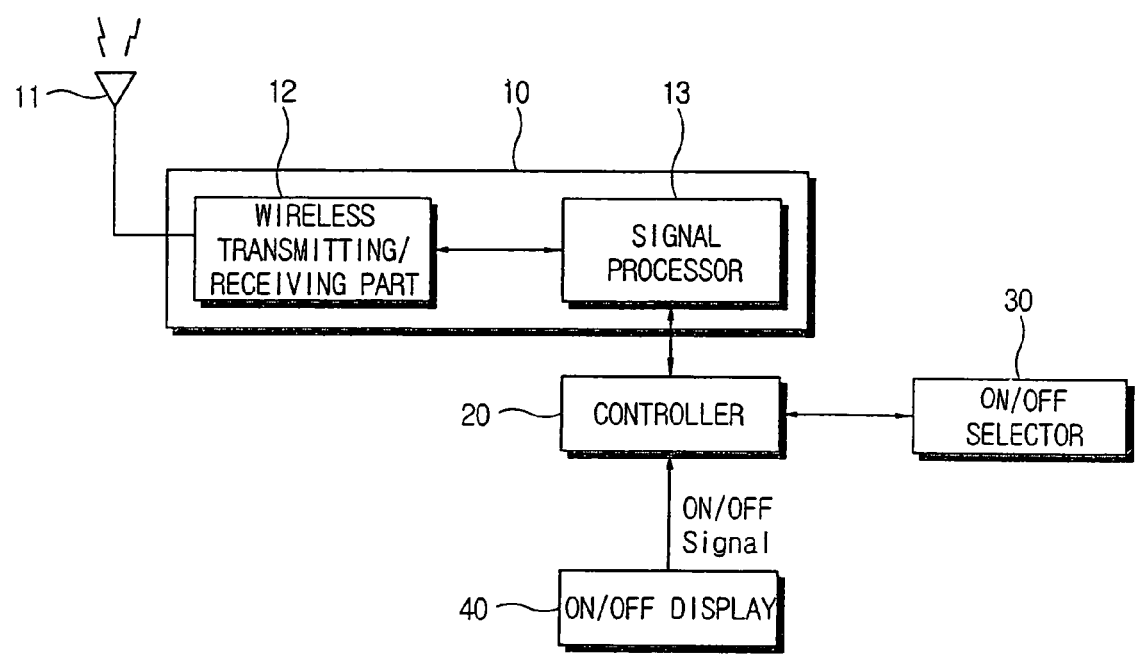
FIG. 1 is a control block diagram of an electronic device according to an aspect of the invention.

Reference will now be made in detail to the embodiments of the invention, examples of which are illustrated in the accompanying drawings, wherein like reference numerals refer to like elements throughout. The embodiments are described below to explain the present invention by referring to the figures.

FIG. 1 is a control block diagram of a wirelessly communicating electronic device. As shown, the electronic device includes a wireless network part 10; an on/off selector 40 turning on/off the wireless network part 10; an on/off displayer 30 displaying an on/off state of the wireless network part 10; and a controller controlling the wireless network part 10, the on/off selector 30 and the on/off display 40. Herein, the electronic device according to an aspect of the invention communicates wirelessly through a wireless LAN.

The wireless network part 10 includes an antenna 11; a wireless transmitting/receiving part 12 transmitting and receiving a RF (Radio Frequency) signal through the antenna 11; and a signal processor 13 processing the RF signal transmitted/received through the wireless transmitting/receiving part 12. Herein, the signal processor 13 modulates and demodulates the RF signal transmitted/received through the wireless transmitting/receiving part 12.

The on/off selector 30 generates an on/off signal to turn on/off the wireless network part 10. The on/off selector 30 will be described in more detail below.

Figure 2:
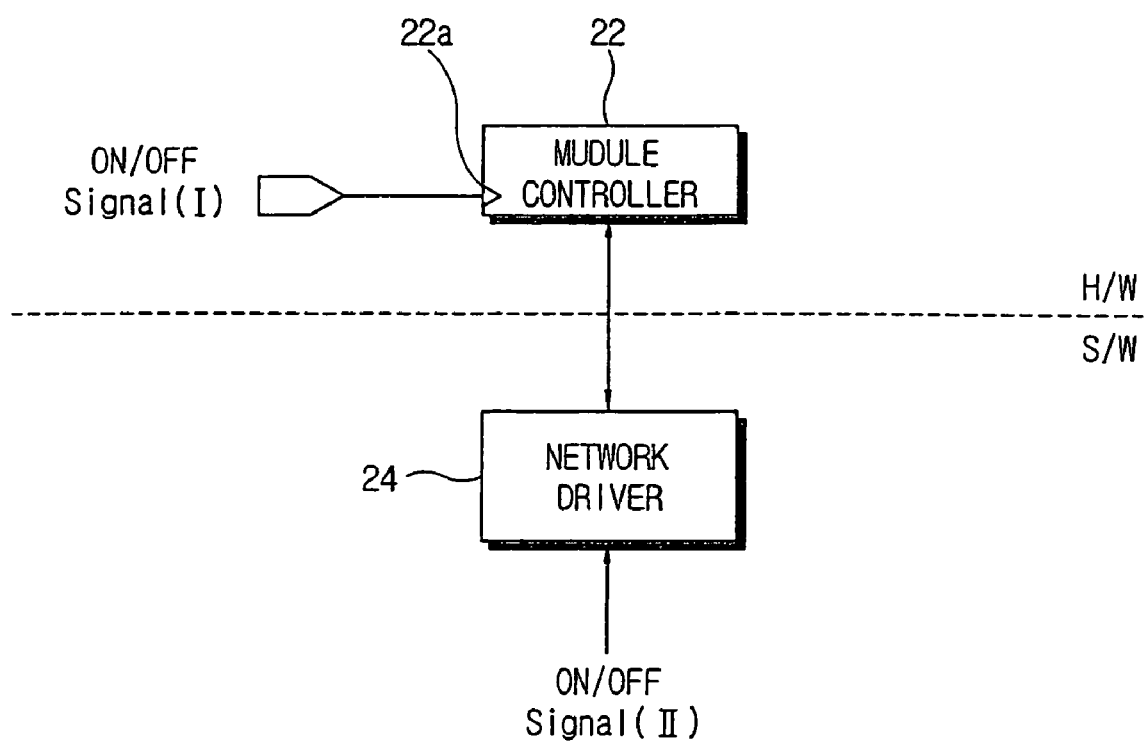
FIG. 2 illustrates a configurational aspect of a controller according to an aspect of the invention.

FIG. 2 is a control block diagram of a controller 20 according to the aspect of the invention. As shown therein, the controller 20 includes a module controller 22 as a hardware component and a network driver 24 as a software component. Herein, the module controller 22 includes a card or a kind of module (hereinafter, refer to "wireless network module") integrally combined to the wireless network part 10. The network driver 24 is stored to an electronic device, in this case, a hard disk drive 55 of a computer 1.

The controller 20 turns on/off the wireless network part 10 according to the on/off signal from the on/off selector 30. Herein, the on/off signal transmitted from the on/off selector 30 may be directly inputted via a pin 22a (hereinafter, referred to as an "on/off pin") of the module controller 22. Meanwhile, the network driver may detect the on/off signal, and controls the module controller 22 to turn on/off the wireless network part 10. Further, the controller 20 may include both the on/off selector 30 and the module controller 22 to turn on/off the wireless network part 10.

Further, the controller 20 may display the on/off state of the wireless network 10 on the on/off display 30. Herein, the controller 20 determines the on/off state of the wireless network part 10, and informs to a user whether the wireless network part 10 is currently activated by displaying a checking result on the on/off display 40.

According to an aspect of the invention, the on/off display 40 may include an image display (refer to the numeral reference 30a in FIG. 3) displaying an image thereon. For example, when the electronic device is the computer 1, the image display may include an LCD (Liquid Crystal Display) or a CRT display (Cathode Ray Tube). The controller 20 can visually present the on/off state of the wireless network part 10 using a text or other symbols on the image display.

Moreover, the on/off display 40 may include a signal, such as an LED (Light Emitting Diode) flashing light depending on the on/off state of the wireless network part 10. For example, the controller 20 emits a red LED 30b when the wireless network part 10 is in the off state, and emits a green LED when the wireless network part 10 is in the on state to visually represent the on/off state of the wireless network part 10 to the user.

Hereinbelow, the electronic device according to an aspect of the invention will be described in detail, referring to FIG. 3.

According to an aspect of the invention, a computer 1 includes a CPU (Central Processing Unit) 50; an image display 30a; a graphics controller connected with the image display 30a and generating an image signal to the image display 30a; a MCH (Memory Control Hub) 51; and an ICH (Input/Output Control Hub) 52.

A memory 53 includes a RAM (Random Access Memory) 53a as a non-volatile memory; a ROM BIOS (Basic Input Output System) 53b storing a BIOS and a startup routine; and a CMOS RAM 53c.

The MCH 51 controls the RAM 53a and data traveling between the CPU 50, the RAM 53a, and the graphics controller 54. For example, the graphics controller 54 may be a chipset, such as a GMCH (Graphics Memory Control Hub).

Figure 3:
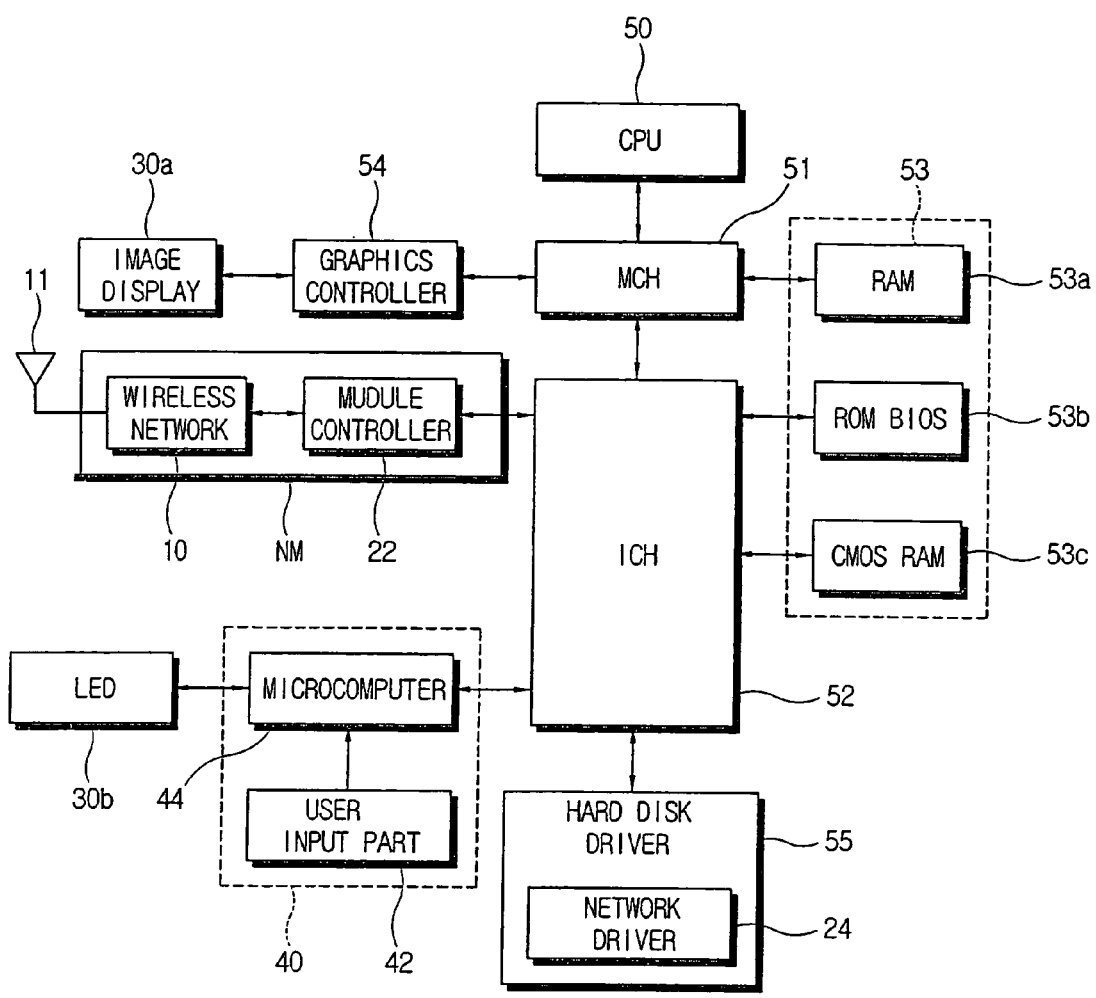
FIG. 3 is control block of a computer according to an aspect of the invention.
Figure 4:
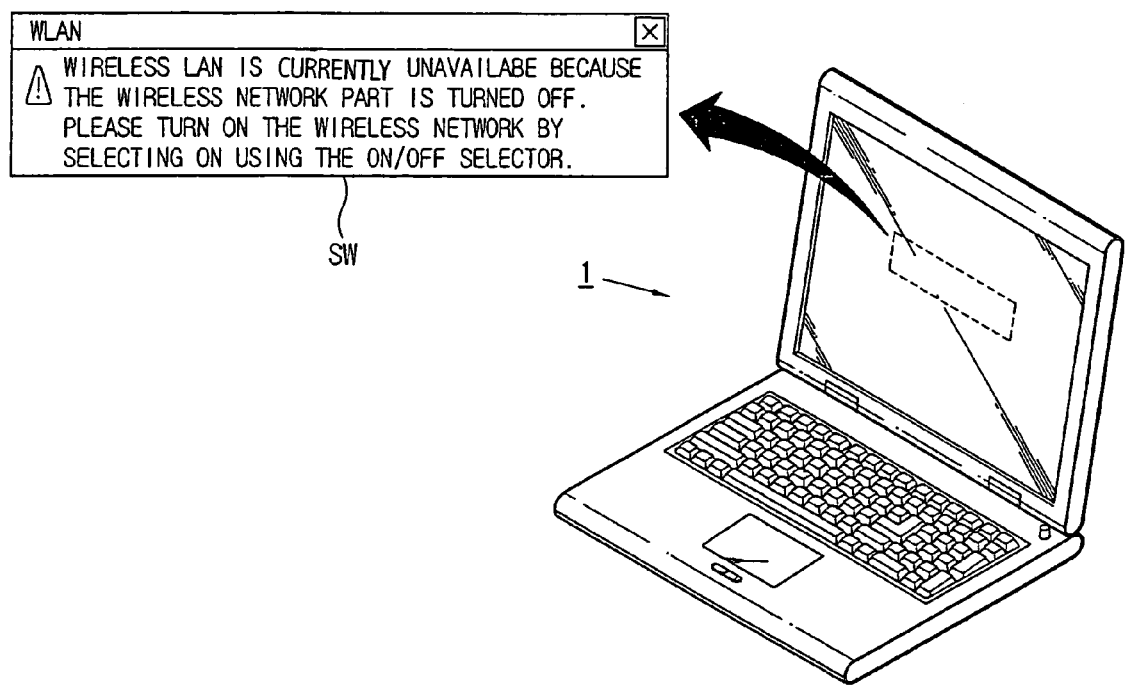
FIG. 4 illustrates on/off state information of a wireless network part displayed on an on/off display according to another aspect of the invention.

The ICH 52 manages the data traveling between other hardware components such as the ROM BIOS 53b, the CMOS RAM 53c, the hard disk drive 55 and a microcomputer 44, excluding the RAM 53a and the graphics controller 54 which are connected with the MCH 51, as shown in FIG. 3.

Meanwhile, the controller 20 of the computer 1 includes a module controller 22 provided in the wireless network module and a network driver 24 stored in the hard disk drive 55.

In addition, an on/off selector 40 of the computer 1 includes the microcomputer 44 and a user input part 42 connected to the microcomputer 44 and generating a key signal corresponding to a user's operation. Herein, the microcomputer 44 is connected with an on/off pin 22a of the module controller 22. Thus, the microcomputer 44 inputs an on/off signal to the on/off pin 22a of the module controller 22 to turn on/off the wireless network part 10 corresponding with the key signal generated from the user input part 42. Accordingly, the module controller 22 turns on/off the wireless network part 10.

Further, the microcomputer 44 may supply the network driver 24 with the on/off signal corresponding with the key signal from the user input part 42. Herein, the network driver 24, as described herebefore, controls the module controller 22 to turn on/off the wireless network part 1p corresponding to the on/off signal from the microcomputer 44. Herein, the network driver 24 may provide a user interface (UI) on the image display 30a so that the user can input the key signal there through. Further, the user interface may be provided by an application program that is operated from an operating system of the computer 1.

The key signal generated from the user input part 42 may be transmitted to the controller 22 through various routes, including the above-described method. For example, when the user input part 42 is a keyboard, the keyboard may include a function key to select the on/off state of the wireless network part 10. Herein, when the microcomputer 44 detects that the key signal is inputted from the function key, the microcomputer 44 may supply the on/off signal to the module controller 22 through a GPIO (General Purpose Input Output).

Meanwhile, according to an aspect of the invention, the on/off display 40 of the computer 1 may include an image display 30a. Herein, the controller 20 displays a state window (SW) visually representing the on/off state of the wireless network part 10 using a text on the image display 30a.

In addition, the on/off display 40 of the computer 1 may include a LED 30b connected with the microcomputer 44. Herein, the microcomputer 44 controls the LED 30b to flash light corresponding to a given control signal from the controller 22.

Meanwhile, according to another aspect of the invention, when the controller 20 detects a signal satisfying a given condition, the controller 20 enables the on/off state of the wireless network part 10 to be displayed on the on/off display 40. For example, when the user wants to wirelessly access the Internet through the wireless LAN, the controller 20 detects that and displays the on/off state of the wireless network part 10 on the on/off display 40. Accordingly, if the user tries to activate the wireless network part for the Internet access while the state of the wireless network part 10 is the off state, the controller informs the user that the wireless network part 10 is currently turned off by the on/off selector 30.

Figure 5:
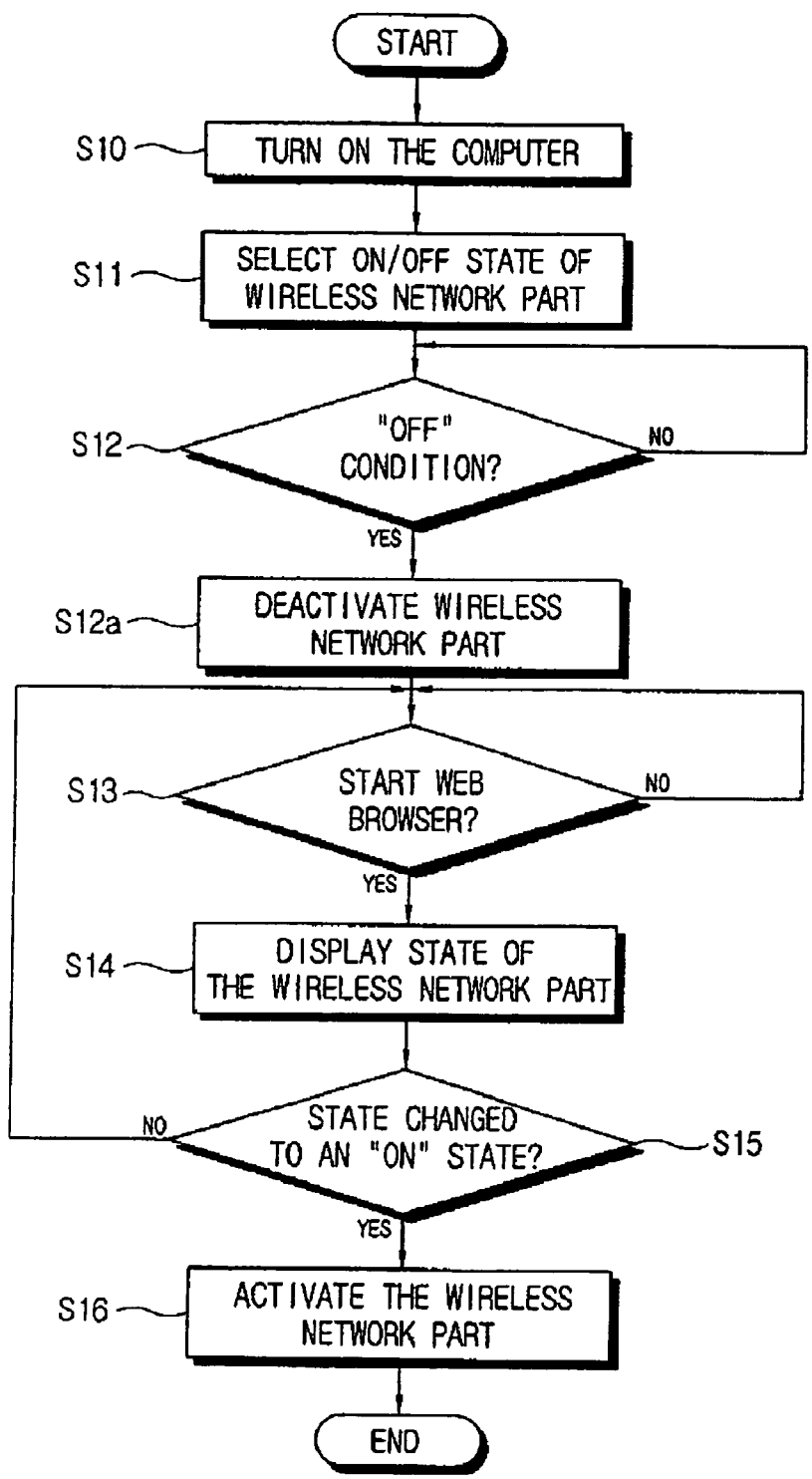
FIG. 5 is a control flow of the computer according to the aspect of the invention.

Hereinafter, a control flow of the computer 1 according to an aspect of the invention will be described, referring to FIG. 5. Herein, the computer 1 receives an input satisfying a given condition while the wireless network part 10 is in the off state and displays the on/off state of the wireless network part 10 on the on/off display 40.

At first, when the computer 1 is turned on at operation S10, the wireless network part 10 is set to an on state. Herein, the user can select on/off state of the wireless network part through the on/off selector at operation S11. If the controller 20 detects the off state of the wireless network part at operation S12, the controller 20 deactivates the wireless network part 10 at operation S12a. Accordingly, no signal is transmitted to and/or received from the wireless network part 10.

Next, the user may start a web browser when the wireless network part 10 is in the off state at operation S13. In such case, the controller 20 displays on the on/off display 40 that the wireless network part 10 is in the off state, at operation S14.

Herein, when the user controls the on/off selector 30 to change the state of the wireless network part 10 from the off state to the on state at operation S15, the controller 20 activates the wireless network part 10. Accordingly, the user can wirelessly access the Internet through the wireless LAN, at operation S16.

According to an aspect of the invention, there is provided an electronic device including the wireless network part 10 supporting wireless communication; the on/off selector 30 selecting the on/off state to activate or deactivate the wireless network 10; the on/off display 40 displaying the on/off state of the wireless network part 10; and the controller 20 activating/deactivating the wireless network part 10 corresponding to a selecting result of the on/off selector 40 and displaying the on/off state of the wireless network part 10 to provide the user with information related to the on/off state of the wireless network part 10. Accordingly, the user does not misunderstand the off state of the wireless network part as a malfunction of the electronic device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wireless communicating electronic device comprising:
    a wireless network part supporting wireless communication;
    an on/off selector selecting an on/off state of the wireless network part and outputting an on/off signal corresponding to the selected state;
    an on/off display displaying the selected state of the wireless network part; and
    a controller activating/deactivating the wireless network part corresponding to the on/off signal output from the on/off selector, and displaying the selected state of the wireless network part on the on/off display,
    wherein the controller comprises:
    a module controller capable of directly inputting the on/off signal and controlling a state of the wireless network part; and
    a network driver which senses the on/off signal and controls the module controller on the basis of the sensed on/off signal.

2. The device according to claim 1, wherein when the wireless network part is selected to be in the off state by the on/off selector, the controller blocks a signal transmitted through the wireless network part.

3. The device according to claim 2, wherein when the controller detects a signal satisfying a condition when the wireless network part is in the off state, the controller displays that the wireless network part is currently in the off state on the on/off display.

4. The device according to claim 3, wherein the condition is a request for the wireless communication through the wireless network part.

5. The device according to claim 1, wherein the on/off display comprises:
    an image display device displaying an image.

6. The device according to claim 1, wherein the on/off display comprises a Light Emitting Diode flashing corresponding to the on/off state of the wireless network part.

7. The device according to claim 1, wherein the module controller comprises an on/off pin in which the on/off signal is directly input.

8. The device according to claim 1, wherein the on/off selector comprises:
    a user input part generating a key signal corresponding to a user's operation; and
    a microcomputer generating an on/off signal corresponding to the key signal and inputting the on/off signal to the controller.

9. The device according to claim 8, wherein the microcomputer inputs the on/off signal selectively to the module controller or the network driver.

10. A method comprising:
    supporting wireless communication using a wireless network part;
    inputting directly a signal for turning off the wireless network part and controlling a state of the wireless network part on the basis of the signal, using a module controller;
    sensing the signal and controlling the module controller on the basis of the sensed signal using a network driver;
    inputting the signal selectively to the module controller or the network driver to turn off the wireless network part;
    inputting a request for the wireless communication through the wireless network part when the wireless network part is turned off; and
    displaying an off state of the wireless network part.

11. The method according to claim 10, further comprising:
    selecting the off state of the wireless network part, using an on/off selector, the inputting the signal selectively comprising:
    outputting the signal corresponding to the selected state from the on/off selector when the off state of the wireless network part is selected; and
    turning off the wireless network part as the output signal is selectively input to the module controller or the network driver.

* * * * *

UNITED STATES PATENT AND TRADEMARK OFFICE
CERTIFICATE OF CORRECTION

| | | |
|---|---|---|
| PATENT NO. | : 7,453,836 B2 | Page 1 of 1 |
| APPLICATION NO. | : 11/133337 | |
| DATED | : November 18, 2008 | |
| INVENTOR(S) | : Chee-hwan Yang | |

It is certified that error appears in the above-identified patent and that said Letters Patent is hereby corrected as shown below:

Column 6, Line 37, change "part:" to --part;--.

Signed and Sealed this

Seventeenth Day of February, 2009

JOHN DOLL
*Acting Director of the United States Patent and Trademark Office*